Nov. 29, 1927.
T. A. EDISON
1,651,196
STORAGE BATTERY
Filed May 14, 1923
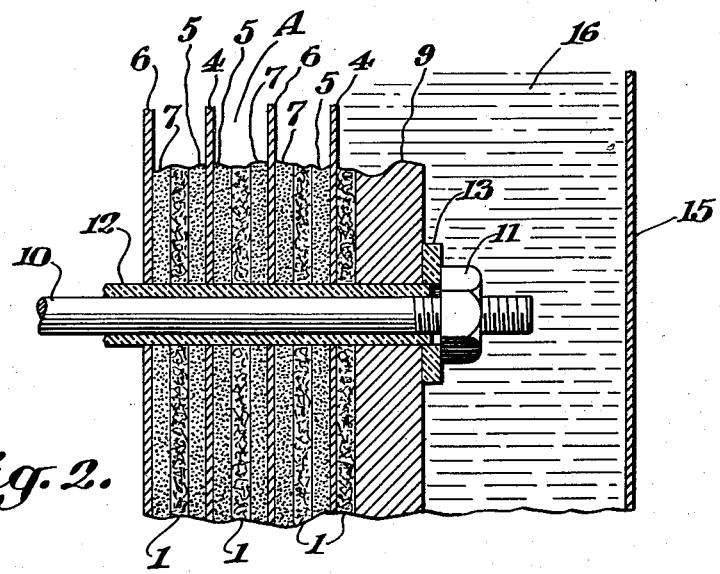
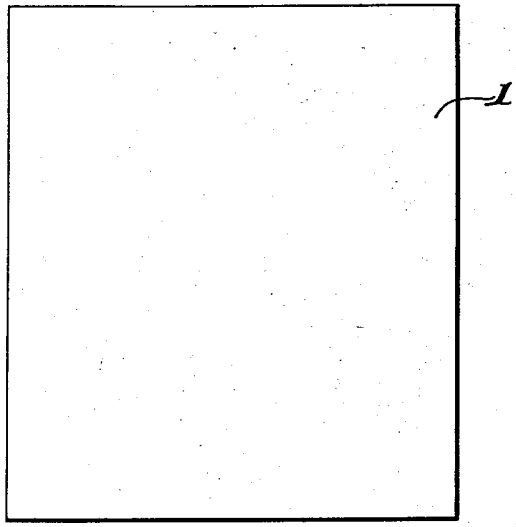
Inventor:
Thomas A. Edison
by Henry Lanahan
his Atty.

Patented Nov. 29, 1927.

1,651,196

UNITED STATES PATENT OFFICE.

THOMAS A. EDISON, OF LLEWELLYN PARK, WEST ORANGE, NEW JERSEY, ASSIGNOR TO THOMAS A. EDISON, INCORPORATED, OF WEST ORANGE, NEW JERSEY, A CORPORATION OF NEW JERSEY.

STORAGE BATTERY.

Application filed May 14, 1923. Serial No. 638,694.

My invention relates to storage batteries and more particularly to the means for separating and insulating the electrode elements of storage battery cells, especially those of the type wherein nickel hydroxide is opposed to finely divided electrolytically active iron or oxide of iron in an alkaline solution as the electrolyte. My invention also relates to the method of producing and treating means for insulating and separating the electrode elements of storage battery cells.

The principal object of my invention is to produce insulating separators for the electrode elements of storage battery cells which will be of a high porosity, especially when maintained under great pressure as, for example, in the case of the insulating separators employed in the form of cell disclosed in Patent No. 1,377,194, granted to me on May 10, 1921. In the cell disclosed in this patent a battery pile of special construction is employed in place of the usual plate assembly in Edison storage battery cells. This battery pile comprises a series of very thin conductive sheets, preferably formed of nickel, separated by thin insulating sheets of asbestos paper, with thin layers of finely divided active material respectively disposed between the surfaces of each of the thin nickel sheets and the adjacent asbestos sheets, the whole being held together under great pressure with the layers of active material in firm, close surface contact with the respective nickel sheets. The layers of active material for the negative elements, preferably consist of electrolytically finely divided iron or oxide of iron, preferably mixed with a small amount of mercury, and the layers of active material for the positive elements preferably consist of finely divided nickel hydroxide. Prior to the present invention, the insulating sheets employed in cells of the character just described, have been formed of long-fibre asbestos paper. I find that the capacity of these cells, however, at high discharge rates, is considerably below that which should be obtained, and that the capacity decreases to some extent with the length of time the cells are in use, due, I believe, to the fact that the asbestos sheets are so compressed by the great pressure to which the same are subjected and under which they are maintained that the porosity thereof is greatly reduced or, in other words, the asbestos sheets are rendered more impervious to the passage of the electrolyte. Consequently, the circulation of the electrolyte is impaired to such an extent as to effect a material increase in the internal resistance of the cells.

I have found that greatly improved results may be obtained by employing in cells of the character described insulating separating sheets in which the asbestos fibre or other insulating fibre employed for such sheets is combined or mixed with a proper amount of any of a number of substances while being formed into the paper from which the sheets are cut, and which substance is subsequently eliminated from the sheets, preferably after subjecting the assembled battery pile to the final pressure under which it is maintained when in use.

To obtain the desired results, I preferably proceed as follows: In making the asbestos separating and insulating sheets for the cells, I introduce into the asbestos fibre while making the asbestos paper from which the sheets are cut, a certain proportion of a chemical substance of slight solubility in water so that the asbestos paper when produced will contain a certain percentage of such substance. The insulating separator sheets cut from this paper are coated on one face with finely divided metallic iron and on the other face with finely divided nickel hydroxide. These coated asbestos sheets are then placed between steel dies and subjected to a pressure of several thousand pounds per square inch after which they are assembled into a battery pile such as described above. This battery pile is subjected to a high pressure in a hydraulic press and while held under pressure therein the elements of the pile are secured rigidly together by bolts and nuts so that such elements will always be maintained under a high pressure with the entire surface of each layer of active material in close, firm contact with the adjacent thin sheet of nickel or other conductive material. At this point the insulating sheets will by reason of the introduction of the chemical substance referred to, be more impervious to the circulation of liquid therethrough than would be the case if the insulating sheets were formed of asbestos fibre alone. All or nearly all of the chemical substance referred to, however, is then eliminated from the insulating sheets, and I preferably accomplish this by immersing the pile in a solution of a material which will react with said substance to form an extremely soluble salt. This salt will, in a short time, percolate out into the main body of the solution and leave the asbestos insulating sheet sufficiently porous to permit of a fairly rapid and sufficient circulation of the electrolyte of the cell in which the pile is subsequently used, to effect a material reduction in the resistance of the pile and thereby prevent undue heating. While any of a number of organic acids such as cresotinic and salicylic acids may be used for the substance mixed or combined with the asbestos or other insulating fibre from which the insulating sheets are formed, I prefer to employ salicylic acid as the latter is crystalline and its crystals are in the form of fine fibres which blend or mix very well with the asbestos fibres.

Where salicylic acid or other organic acid, like cresotinic acid, is the substance mixed with the asbestos fibre in producing the insulating sheets, the solution in which I immerse the battery pile to eliminate such substance is preferably a solution of caustic potash, that is, the same solution as is employed for the electrolyte of the completed cell, although it may be and preferably is a weaker solution than that used for such electrolyte. Upon immersing the pile in this solution, the salicylic or other similar organic acid present in the insulating separators, reacts with the caustic potash to form a very soluble potash salt, and a salt which, moreover, produces no undesired reaction nor deleterious effect in the completed cell in case small quantities thereof remain in the separators. The battery pile after remaining in the solution of caustic potash for a period sufficient to permit most of the salicytate of potash, or other soluble potash salt, where an organic acid other than salicylic acid has been combined with the asbestos fibre in producing the insulating sheets, to be dissolved and percolate from the asbestos separators into the solution, is removed from this solution and disposed in a cell container. The cell is then completed in the usual manner. The battery pile may be placed in the cell container immediately after being assembled. If this is done, the alkaline electrolyte is then introduced into the battery can or cell container, and after the pile has been subjected to the action of the electrolyte a sufficient time to dissolve and remove from the insulating separators, most of the salicylic acid or other organic acid in such separators, the electrolyte is poured out of the container and fresh electrolyte introduced therein and the cell completed. As indicated above, the small amount of salicytate of potash or similar potash salt remaining in the pores of the separators results in no deleterious action when the cell is operated.

Care should be exercised in the amount of salicylic acid or other like organic acid mixed or combined with the asbestos or other insulating fibre when making the paper from which the insulating separators or sheets are cut, for if too much of such substance is employed, there is danger upon removing the same from the separators after the battery pile has been formed, of the separators being broken down and highly compressed by the high pressure under which the pile is maintained. If this occurs, the porosity of the separators produced by the removal of the salicylic acid or other organic acid, will be largely destroyed and accordingly the object sought to be attained, defeated. I have found that very good results are obtained where the insulating sheets have incorporated therein 10% to 15% by volume of salicylic acid or other similar organic acid.

In order that my invention may be more clearly understood, attention is directed to the drawing accompanying and forming a part of this specification, and in which:

Figure 2 is an enlarged fragmental, sectional view of a storage battery cell of the type disclosed in my Patent No. 1,377,194 referred to above; and Figure 1 is a plan view of one of the asbestos insulating sheets for the cell shown in Figure 2.

Referring to the drawing, reference character 1 represents one of the asbestos insulating sheets formed as described above, prior to the assembly thereof into a battery pile and prior to the elimination of the salicylic or other similar organic acid. Each of a plurality of these sheets is coated on one side or face with electrolytically active finely divided iron and on the opposite side or face with finely divided nickel hydroxide, and the coated sheets together with a plurality of thin conductive sheets, preferably formed of nickel, are assembled into a battery pile A, Figure 2. The battery pile A comprises a plurality of superposed and alternately arranged negative and positive electrode elements, each of the negative elements consisting of a very thin conductive sheet or foil 4, preferably of nickel, and two thin layers 5 of the electrolytically active finely divided iron respectively disposed on opposite sides of the sheet or foil 4, and each of the positive elements consisting of a thin conductive sheet or foil 6 similar to the sheets or foils 4 of the negative elements, and two thin layers 7 of the powdered nickel hydroxide respectively disposed on opposite sides of the sheet or foil 6 and in contact therewith. The insulating sheets 1 are respectively disposed between the negative and positive elements, and each of these sheets is of course coated on one side with the layer 5 of the finely divided iron 6 in contact with the adjacent thin nickel sheet or foil 4 and on its other side with the layer 7 of the nickel hydroxide which is in contact with the adjacent nickel sheet or foil 6. Strong, heavy nickel plated pressure plates are respectively disposed at the sides of the superposed negative and positive elements in contact therewith, only one of these plates, indicated by reference character 9, being shown. The conductive sheet or foil 4 of each of the outermost negative elements is not in contact at its outer surface with a layer of finely divided iron but is merely separated and insulated from the adjacent pressure plate by an uncoated insulating sheet 1. Reference character 10 represents one of a plurality of rods which extend through the battery pile and pressure plates to hold the pile assembled. The rod 10 at one end, extends outwardly beyond the adjacent pressure plate 9 and has a nut 11 threaded thereon. The pile A is subjected to pressure and the elements thereof then secured together so as to be maintained under pressure and so that the layers of active material will be maintained in firm, intimate and uninterrupted surface contact with the respective adjacent nickel sheets 4 and 6, as hereinbefore described. Each rod 10 extends through a sleeve 12 of hard rubber or other suitable non-conducting material which is disposed in and closely fits openings provided for the rod in the assembled elements of the pile. The nut 11 on each rod 10 is suitably insulated from the adjacent pressure plate 9 as by means of a washer 13 formed of hard rubber or other suitable non-conducting material.

The pile A is immersed in an alkaline solution, as described above, to eliminate or remove all or most of the salicylic or other similar acid from the insulating sheets 1 and if not then in the battery can or cell container 15, is disposed in the latter. Fresh electrolyte 16 is then introduced into the cell container 15 and the cell completed.

While I prefer to employ finely divided iron and nickel hydroxide as the active materials of the cells where the latter are of the Edison type, other suitable active materials may be employed. For example, in place of finely divided iron as the active material for the negative elements, finely divided cadmium or cobalt may be employed as disclosed respectively in my Patents Nos. 692,507, dated Feb. 4, 1902, and 721,682, dated March 3, 1903; and in place of the nickel hydroxide as the active material for the positive elements, an oxide of cobalt may be employed as disclosed in my Patent No. 704,304, dated July 8, 1902.

Having now described my invention, what I claim as new and desire to protect by Letters Patent, is as follows:

1. An insulating separator for maintaining adjacent electrode elements of a battery cell in spaced relation formed of a mixture of insulating material and salicylic acid, substantially as described.

2. Means for separating the electrode elements of storage battery cells consisting solely of asbestos mixed with a substance adapted to be subsequently eliminated to thereby increase the porosity of said means, substantially as described.

3. An insulating separator for maintaining adjacent electrode elements of a battery cell in spaced relation formed of a mixture of insulating material and an organic acid which is readily soluble in an alkaline solution, substantially as described.

4. Means for separating the electrode elements of storage battery cells consisting solely of asbestos mixed with a substance adapted to be subsequently dissolved to thereby increase the porosity of said means, substantially as described.

5. Means for separating the electrode elements of storage battery cells consisting solely of asbestos mixed with a substance which is soluble in the electrolyte for such cells, substantially as described.

6. Means for separating the electrode elements of alkaline storage battery cells consisting solely of asbestos mixed with a substance which is soluble in an alkaline solution, substantially as described.

7. Means for separating the electrode elements of storage battery cells consisting solely of asbestos mixed with a substance which is soluble in a solution of a hydroxide of an alkaline metal, substantially as described.

8. Means for separating the electrode elements of storage battery cells comprising a mixture of asbestos and salicylic acid, substantially as described.

9. Means for separating the electrode elements of storage battery cells comprising asbestos paper having incorporated therein 10% to 15% by volume of salicylic acid, substantially as described.

10. Means for separating the electrode elements of storage battery cells comprising asbestos paper having incorporated therein 10% to 15% by volume of a substance which is only slightly soluble in water, but which is readily soluble in the electrolyte for such cells, substantially as described.

11. Means for separating the electrode elements of storage battery cells comprising a mixture of asbestos fibre and salicylic acid in a fibrous state, substantially as described.

12. Means for separating the electrode elements of storage battery cells comprising paper formed of a mixture of asbestos and an organic acid which is only slightly soluble in water but which is readily soluble in an alkaline solution, substantially as described.

This specification signed this 11th day of May, 1923.

THOS. A. EDISON.